US011961176B2

(12) United States Patent
Pantaleoni

(10) Patent No.: US 11,961,176 B2
(45) Date of Patent: Apr. 16, 2024

(54) GLOBAL ILLUMINATION USING SHARED LIGHTING CONTRIBUTIONS FOR INTERACTIONS IN PATH TRACING

(71) Applicant: NVIDIA Corporation, Santa Clara, CA (US)

(72) Inventor: Jacopo Pantaleoni, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/666,413

(22) Filed: Feb. 7, 2022

(65) Prior Publication Data

US 2022/0165016 A1 May 26, 2022

Related U.S. Application Data

(63) Continuation of application No. 16/523,368, filed on Jul. 26, 2019, now Pat. No. 11,244,493.

(60) Provisional application No. 62/703,605, filed on Jul. 26, 2018.

(51) Int. Cl.
*G06T 15/50* (2011.01)
*G06T 15/06* (2011.01)

(52) U.S. Cl.
CPC ............ *G06T 15/06* (2013.01); *G06T 15/506* (2013.01)

(58) Field of Classification Search
CPC ....... G06T 15/506; G06T 15/50; G06T 15/80; G06T 15/60; G06T 15/06
USPC .......................................................... 345/426
See application file for complete search history.

(56) References Cited

U.S. PATENT DOCUMENTS

| 7,199,795 | B2 | 4/2007 | Christensen et al. |
| 8,207,968 | B1 | 6/2012 | Krishnaswamy et al. |
| 8,223,148 | B1 | 7/2012 | Carr et al. |
| 8,314,797 | B1 | 11/2012 | Krishnaswamy et al. |
| 9,953,457 | B2 | 4/2018 | Keller et al. |
| 10,679,407 | B2 | 6/2020 | Schissler et al. |

(Continued)

FOREIGN PATENT DOCUMENTS

EP 3 220 356 A1 9/2017

OTHER PUBLICATIONS

Bekaert, P., et al., "Accelerating Path Tracing by Re-Using Paths", Thirteenth Eurographics Workshop on Rendering, pp. 1-10 (2002).

(Continued)

*Primary Examiner* — Gordon G Liu
(74) *Attorney, Agent, or Firm* — Taylor English Duma L.L.P.

(57) ABSTRACT

Disclosed approaches provide for interactions of secondary rays of light transport paths in a virtual environment to share lighting contributions when determining lighting conditions for a light transport path. Interactions may be shared based on similarities in characteristics (e.g., hit locations), which may define a region in which interactions may share lighting condition data. The region may correspond to a texel of a texture map and lighting contribution data for interactions may be accumulated to the texel spatially and/or temporally, then used to compute composite lighting contribution data that estimates radiance at an interaction. Approaches are also provided for reprojecting lighting contributions of interactions to pixels to share lighting contribution data from secondary bounces of light transport paths while avoiding potential over blurring.

20 Claims, 10 Drawing Sheets

(56) References Cited

U.S. PATENT DOCUMENTS

| | | | |
|---|---|---|---|
| 10,952,302 | B2 | 3/2021 | Ashdown et al. |
| 2004/0125103 | A1 | 7/2004 | Kaufman et al. |
| 2006/0066608 | A1* | 3/2006 | Appolloni ............... G06T 19/00 |
| | | | 345/419 |
| 2007/0206008 | A1 | 9/2007 | Kaufman et al. |
| 2008/0122846 | A1 | 5/2008 | Brown et al. |
| 2009/0167763 | A1 | 7/2009 | Waechter et al. |
| 2010/0164948 | A1 | 7/2010 | Kho et al. |
| 2013/0176313 | A1* | 7/2013 | Gautron ................. G06T 15/50 |
| | | | 345/426 |
| 2015/0084957 | A1* | 3/2015 | Shin ....................... G06T 15/06 |
| | | | 345/426 |
| 2016/0005217 | A1 | 1/2016 | Tokuyoshi |
| 2018/0061111 | A1 | 3/2018 | Engel et al. |
| 2018/0096516 | A1 | 4/2018 | Luebke et al. |
| 2018/0315251 | A1* | 11/2018 | Sun ........................ G06T 15/06 |

OTHER PUBLICATIONS

Lafortune, E., P., et al., "Reducing the number of shadow rays in bidirectional path tracing", Department of Computer Science, pp. 1-9 (1995).

Laurijssen, J., et al., "Fast Estimation and Rendering of Indirect Highlights", Eurographics Symposium on Rendering, Computer Graphics Forum, vol. 29, No. 4, pp. 1-9 (2010).

Liktor, G., et al., "Decoupled deferred shading for hardware rasterization", Proceedings of the ACM SIGGRAPH Symposium on Interactive 3D Graphics and Games, pp. 1-8 (2012).

Meissner, M., et al., "VIZARD II, A PCI Card for Real-Time Volume Rendering", In Proceedings of the Siggraph/Eurographics Workshop on Graphics Hardware, Retrived from Internet URL: http://www.gris.uni-tuebingen.de, pp. 1-7 (1998).

Munkberg, J., et al. "Texture space caching and reconstruction for ray tracing", ACM, Transactions on Graphics, DOI: http://dx.doi.org/10.1145/2980179.2982407, vol. 35, No. 6, pp. 1-13 (2016).

International Preliminary Report on Patentability received for PCT Application No. PCT/US2020/046816, dated Mar. 3, 2022, 8 pages.

Preinterview First Office Action dated Apr. 1, 2022 in U.S. Appl. No. 16/996,045, 4 pages.

Pantaleoni, Jacopo; International Search Report and Written Opinion for PCT Application No. PCT/US2019/043673, filed Jul. 26, 2019, mailed Oct. 14, 2019, 12 pgs.

Pantaleoni, Jacopo; International Preliminary Report on Patentability for PCT Application No. PCT/US2019/043673, filed Jul. 26, 2019, mailed Feb. 4, 2021, 9 pgs.

Larijssen, et al.: "Fast Estimation and Rendering of Indirect Highlights," Computer Graphics Forum, vol. 29, No. 4, Jun. 26, 2010, 9 pgs.

Munkberg, et al.; "Texture space caching and reconstruction for ray tracing," ACM Transactions on Graphics, ACM; vol. 35, No. 6, Nov. 11, 2016, 13 pgs.

Pantaleoni, Jacopo; First Office Action for Chinese Patent Application No. 201980061184.3, filed Mar. 16, 2021, mailed Dec. 4, 2023, 10 pgs.

\* cited by examiner

GLOBAL ILLUMINATION USING SHARED LIGHTING CONTRIBUTIONS FOR INTERACTIONS IN PATH TRACING

CROSS-REFERENCE TO RELATED APPLICATIONS

This application is a continuation of U.S. patent application Ser. No. 16/523,368 filed Jul. 26, 2019, which claims the benefit of U.S. Provisional Application No. 62/703,605, filed on Jul. 26, 2018. Each of these applications is incorporated herein by reference in its entirety.

BACKGROUND

Global illumination is used in image rendering applications to simulate lighting conditions in a virtual environment by taking into account not only light that comes directly from a light source (direct illumination), but also light that is reflected off of surfaces (indirect illumination). Path tracing is an approach to global illumination in which lighting contributions at different points along ray-traced light transport paths (usually having of an initial or primary ray and a number of reflected or secondary rays) may be combined to determine lighting conditions observed by a viewpoint camera.

Conventional approaches to path tracing require a large amount of secondary rays (e.g., rays other than initial or primary rays that may be cast from a primary ray) to sample lighting conditions for each pixel in order for the pixel to accurately reflect lighting conditions in the virtual environment. For example, in a light transport path, a ray may interact with a diffuse surface where the lighting contribution that is sampled only accounts for one direction (of many possible directions) in which light particles may scatter from the surface. Many secondary rays may be cast to sample other directions to more accurately estimate the lighting contribution of the interaction to the light transport path. Due to the potentially large number of samples, the computational resources required to render such a scene may impose too great of a delay for real-time rendering applications, such as gaming.

SUMMARY

Embodiments of the present disclosure provide for global illumination using spatial-temporal accumulation. In various respects, the present disclosure provides improved approaches for determining lighting contributions of interactions along light transport paths that may be used for global illumination.

The present disclosure, in contrast to traditional approaches, provides for interactions of secondary rays of light transport paths in a virtual environment to share lighting contributions when determining lighting conditions for a light transport path. This allows the system to leverage additional information and increase the effective sample count of interactions without casting additional rays from the interactions. As such, fewer samples may be needed to determine lighting conditions for pixels that accurately reflect the environment.

A lighting contribution of an interaction may be shared with another interaction when the interaction is sufficiently similar to serve as an approximation of a sample for the other interaction. For example, interactions may be shared based on similarities in characteristics, such as hit locations, hit distances of corresponding secondary rays, lengths of light transport paths up to the interactions, numbers of bounces to the interactions, and/or areas of path footprint approximations at the interactions. The characteristics may define a region in which interactions may share lighting condition data. The region may correspond to a texel of a texture map and lighting contribution data for interactions may be accumulated to the texel spatially and/or temporally, then used to compute composite lighting contribution data that estimates radiance at an interaction. Approaches are also provided for reprojecting lighting contributions of interactions to pixels to share lighting contribution data from secondary bounces of light transport paths while avoiding potential over blurring.

BRIEF DESCRIPTION OF THE DRAWINGS

The present systems and methods for reflection denoising in ray-tracing applications is described in detail below with reference to the attached drawing figures, wherein.

DETAILED DESCRIPTION

Figure 1:
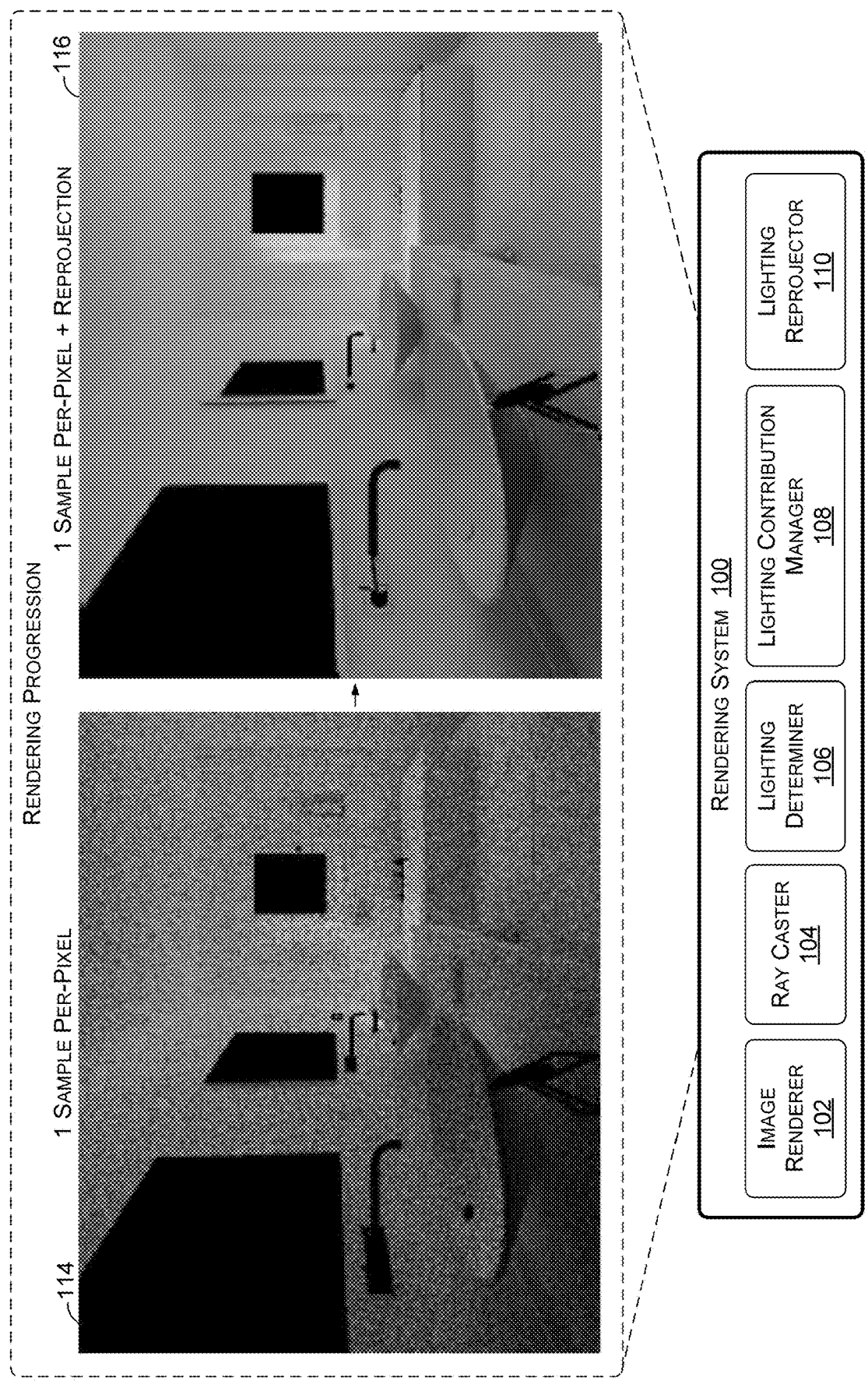
FIG. 1 is an example system diagram of a rendering system, in accordance with some embodiments of the present disclosure.

The present disclosure provides for global illumination using spatial-temporal accumulation. In various respects, the present disclosure provides improved approaches for determining lighting contributions of interactions along light transport paths that may be used for global illumination.

The present disclosure, in contrast to traditional approaches, provides for interactions of secondary rays of light transport paths in a virtual environment to share lighting contributions when determining lighting conditions for a light transport path. This allows the system to leverage additional information and increase the effective sample count of interactions without casting additional rays from the interactions. As such, fewer samples may be needed to determine lighting conditions for pixels that accurately reflect the virtual environment.

In disclosed approaches, when secondary rays of one or more ray-traced light transport paths interact with surface points in a virtual environment, lighting contributions from multiple ones of the interactions may be used to compute a composite lighting contribution that is used as an estimate of radiance (e.g., incident radiance or irradiance) for an interaction in at least one light transport path. For example, the composite lighting contribution may form a discretized finite-element solution to the rendering equation at an interaction.

To ensure the lighting contributions for different interactions are relevant to one another, lighting contributions may be shared based on similarities between characteristics of the interactions. As an example, lighting contributions for different interactions may be shared based on the relative locations of the interactions (e.g., the corresponding surface points of the interactions). For example, lighting contributions for interactions within one or more defined regions of the virtual environment may be shared. In some examples, a region may be defined by a texel of a texture map (e.g., a lightmap) used to render the virtual environment. Interactions that fall within a region defined by the texel may be accumulated to the texel and used to compute a composite lighting contribution for at least one interaction.

Other examples of characteristics that may be used to define and/or determine whether lighting conditions of interactions are shared (and/or how much to weight different lighting contributions when combining them) may be based on the hit distance associated with the incident secondary rays of the interactions, the length of the light transport paths up to the interactions, the number of bounces to the interactions, and/or areas of path footprint approximations that correspond to the incident secondary rays. When values of one or more of those characteristics are within one or more threshold values of one another (e.g., evaluated for individual characteristics and/or as a composite value or metric), the lighting conditions of the corresponding interactions may be shared.

In further examples, the one or more of the characteristics may define a size of a defined region of the virtual environment in which the lighting contributions for interactions may be shared. For example, the hit distance associated with the incident secondary rays of the interactions, the length of the light transport paths up to the interactions, the number of bounces up to the interactions, and/or areas of path footprint approximations that correspond to the incident secondary rays may be used to select and or compute the size of the defined region. In examples where the texture map is implemented as a mipmap, the size may be defined by selecting a level in the mipmap based on the one or more characteristics, and the texel an interaction falls within at the selected level. The system may for each interaction select a level, and lighting contributions of interactions with that selected level may have shared lighting contributions when they each correspond to the texel at that level. By basing the size of the region used to share lighting contributions on the characteristic(s), the regions may be larger for interactions where a coarser approximation of a lighting contribution is appropriate, such as to account for increased blur the farther an interaction is from the viewpoint camera.

Also described are approaches for reprojecting lighting contributions of interactions to pixels to share lighting contribution data from secondary bounces of light transport paths while avoiding potential over blurring. To do so, the system may reproject lighting contribution data using a filter, such as a cross-bilateral filter, that is applied in screen-space to the lighting condition data of the pixels. In examples that combine the reprojection with sharing lighting contributions for indirect lighting, this approach may effectively result in a hybrid between a finite-element solver, and a plain path tracer—essentially taking the finite element solution for bounces 2, . . . , N, and using raw path traced sampling (e.g., Monte Carlo) for the first bounce. This may result in the lighting contribution data for the first bounce being better defined, as it will not be smoothed like the finite-element solution.

With reference to FIG. 1, FIG. 1 is an example system diagram of a rendering system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. By way of example, the rendering system 100 may be implemented on one or more instances of the computing device 1000 of FIG. 10.

The rendering system 100 may include, among other things, an image renderer 102, a ray caster 104, a lighting determiner 106, a lighting contribution manager 108, and a lighting reprojector 110. The image renderer 102 may be configured to render images of virtual environments, such as a virtual environment 200 of FIGS. 2, 3, and 5. To render an image of a virtual environment, the image renderer 102 may employ the ray caster 104, the lighting determiner 106, the lighting contribution manager 108, and the lighting reprojector 110. For example, the image renderer 102 may use those components to implement any of a variety of ray-tracing techniques, such as path tracing. To do so, the ray caster 104 may be configured to trace rays in a virtual environment to define ray-traced light transport paths (e.g., between a viewpoint camera and one or more light sources) within the virtual environment. The lighting determiner 106 may be configured to determine—based at least in part on the traced rays—data representative of lighting contributions (also referred to as lighting contribution data) of interactions of the ray-traced light transport paths in the virtual environment (e.g., with surfaces). The lighting determiner 106 may further aggregate the data representative of the lighting contributions (e.g., incident radiance or irradiance values) to compute data representative of lighting conditions (also referred to as lighting condition data) for rendered images (e.g., for pixels). The lighting contribution manager 108 may be configured to determine and/or define which of the lighting contributions (e.g., each comprising one or more lighting contribution values, such as irradiance values) are shared amongst the interactions in the lighting determiner 106 in computing the data representative of lighting conditions (e.g., comprising one or more lighting condition values). The lighting reprojector 110 may be used by the lighting determiner 106 to reproject lighting contributions of light transport paths in computing the data representative of the lighting conditions.

Figure 2:
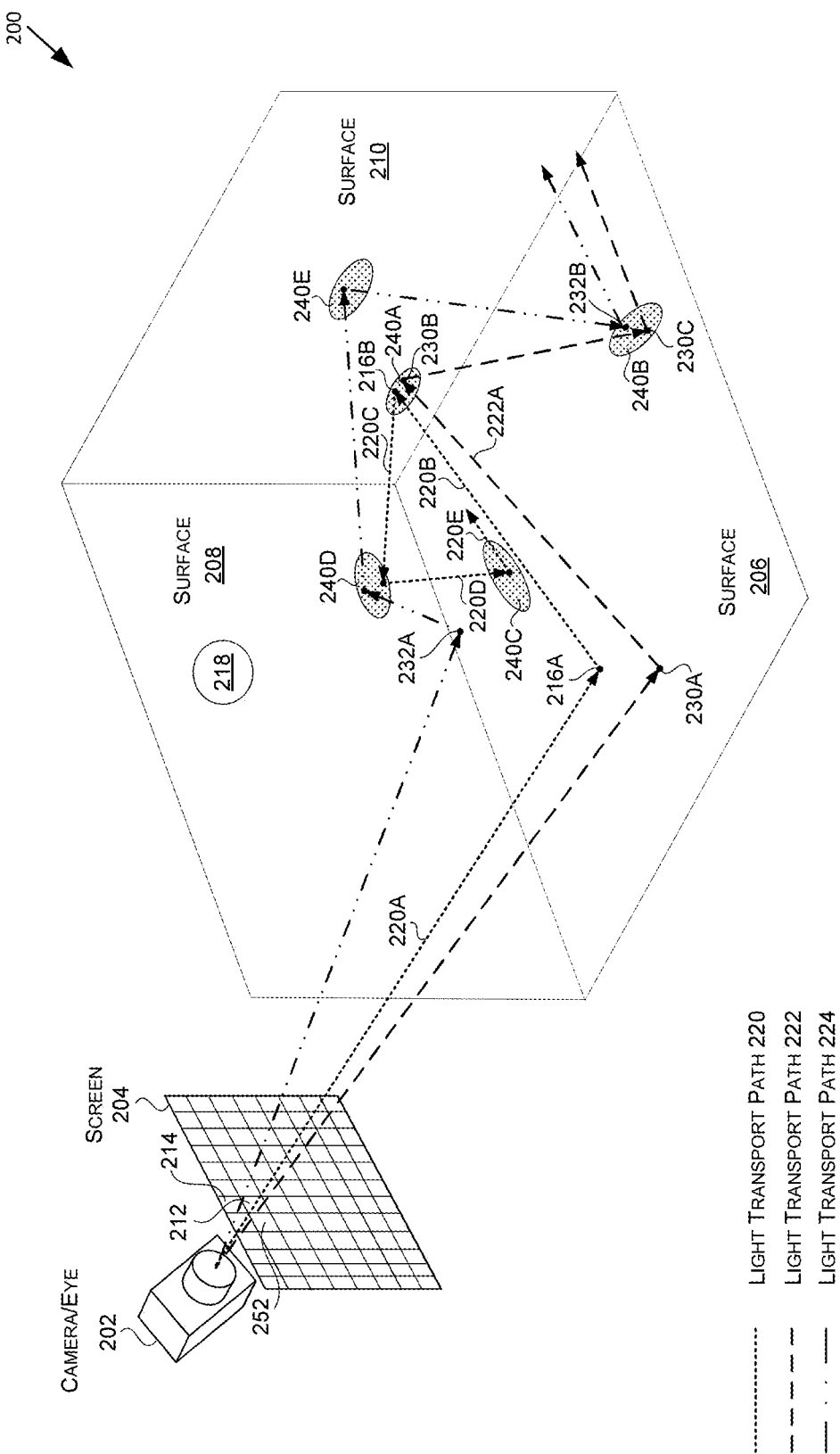
FIG. 2 is a diagram illustrating an example of spatially sharing lighting contributions of light transport paths, in accordance with some embodiments of the present disclosure.

FIG. 1 shows a rendering progression of an image 114 to an image 116, which may correspond to render data generated by the image renderer 102 in rendering a state of a virtual environment, such as the virtual environment 200 of FIG. 2. While the image renderer 102 may be described as rendering the image 114 and the image 116, the various examples described herein are not limited to rendering the image 114 or the image 116. For example, the image 114 and the image 116 need not be fully rendered as shown, but may more generally indicate the lighting condition data at different stages of rendering a final output image. As an example, one or more portions of visual content of the image 114, the image 116, and/or components thereof may be rendered (e.g., incoming radiance) at those stages, and further processing may be performed to produce the final output image.

The image 114 is shown to illustrate a state of the lighting condition data prior to or without using the lighting reprojector 110 for lighting contribution reprojection. The example shown corresponds to a rendering performed by the image renderer 102 at 1 sample per-pixel using path tracing that incorporates shared lighting contribution data, in accordance with disclosed embodiments. While the lighting condition data may include noise, the noise is significantly lower than rendering at 1 sample per-pixel using conventional path tracing. The image 116 is shown to illustrate a state of the lighting condition data after using the lighting reprojector 110 for lighting contribution reprojection. While the noise may still be noticeable, the noise is less noticeable than in the image 114. The noise may be further mitigated—in some embodiments—by additionally processing the lighting condition data of the image 116, such as using spatial and/or temporal denoising filters applied to the lighting condition data that corresponds to the image 116. In some embodiments, the lighting reprojector 110 may not be included in the rendering system 100 or may not be used to render an output image. In such embodiments, the additional processing, such as using the spatial and/or temporal denoising filters may still be applied, for example, to the lighting condition data of the image 114.

The image renderer 102 may render the lighting condition data of the image 114 and the image 116 (and/or portions or components thereof) using any suitable approach that uses rays to sample lighting conditions of a virtual environment (e.g., to generate solutions to the rendering equation for pixels). Thus, while examples herein may be described with respect to path tracing and similar approaches, the present disclosure is contemplated as being more widely applicable.

Referring now to FIG. 2, FIG. 2 is a diagram illustrating an example of spatially sharing lighting contributions of light transport paths, in accordance with some embodiments of the present disclosure. FIG. 2 shows the virtual environment 200 including a camera 202, a screen 204, and surfaces 206, 208, and 210. The camera 202 may be a virtual camera, such as a viewpoint camera, and may represent a perspective of a viewer of the virtual environment 200 to be rendered by the image renderer 102. The screen 204 may be a virtual representation of a screen which may or may not be the same resolution as the image 114, the image 116, and/or other images generated in the rendering pipeline (e.g., the resolution may be converted, translated, or cropped). The screen 204 may include a matrix of virtual pixels or regions, of which a pixel 212, a pixel 214, and a pixel 252 are individually labeled.

The image renderer 102 may use a similar or different approach to determining lighting condition data for each pixel of the screen 204 (e.g., path tracing), an example of which is described with respect to the pixel 212 and a light transport path 220. For example, a similar or different approach may be used for the pixel 214 that involves a light transport path 222 and/or the pixel 252 that involves a light transport path 224. To determine at least some lighting condition data for the pixel 212 (e.g., corresponding to a pixel of the image 114 and/or the image 116 of FIG. 1), the image renderer 102 may use the ray caster 104 to determine one or more ray-traced light transport paths through the virtual environment 200. The light transport path 220 is an example of one of the ray-traced light transport paths for the pixel 212. In embodiments that only use one sample per-pixel to render the state of the virtual environment 200, such as to generate the image 114 or the image 116, the light transport path 220 may be the only path cast against the state and/or used to compute the lighting condition data for the pixel 212. In other cases, any number of light transport paths may be cast for a pixel and combined (e.g., using shared lighting condition data as described herein) to determine the lighting condition data.

The light transport path(s) may be used to sample lighting conditions for the pixel 212. To do so, the ray caster 104 may cast any number of rays (e.g., one or more)—such as a ray 220A of the light transport path 220—through the pixel 212 of the screen 204 to sample lighting conditions for the pixel 212. These rays may be referred to as camera rays, eye rays, incident rays, view vectors, or primary rays, as examples. The ray caster 104 may use the camera rays to determine visible points in the virtual environment 200. For example, the ray caster 104 may use the ray 220A to determine a point 216A on or near the surface 208. This may include the ray caster 104 determining the point 216A as the location where the ray 220A interacts (e.g., intersects) with the surface 208 (or the point 216A may otherwise be based at least in part on that location). Although the ray 202A interacts with the surface 208, in examples where more than one ray is cast, not all rays may interact with a surface.

From each point in the virtual environment 200 that the image renderer 102 determines using a ray cast through the pixel 212, any number of rays (e.g., one or more)—such as a ray 220B—may be cast to sample the lighting contribution (e.g., incident radiance) of the ray 220A at the point 216A. The image renderer 102 may determine the direction of the ray 220B using a stochastic sampling strategy such as a Monte Carlo or a quasi-Monte Carlo sampling strategy. In some examples, the sampling strategy and direction are based at least in part on a normal of the surface 208 at the point 216A. For example, the ray caster 104 may define a Normal Distribution Function (NDF) range for the point 216A based at least in part on the normal of the surface 208 at the point 216A. The ray caster 104 may use the NDF and the ray 220A (and in some examples a roughness value of the surface 208 that is associated with the point 216A) to define a Bidirectional Reflectance Distribution Function (BRDF). The ray caster 104 may sample the BRDF lobe 230 (e.g., stochastically using the BRDF or using another sampling strategy) to determine the ray 220B. The ray caster 104 may use the ray 220B to determine a point 216B on or near the surface 210. Similar to the point 216A, this may include the ray caster 104 determining the point 216B as the location where the ray 220B interacts (e.g., intersects) with the surface 210. Although the ray 220B interacts with the surface 210 in FIG. 2, in examples where more than one ray is cast, not all rays may interact with the surface 210. For example, a ray may interact with a different surface or object, may not interact with any surface or object, or may interact with a light source, such as a light source 218.

The ray caster 104 may, similar to the interaction at the 216A, cast any number of rays (e.g., one or more)—such as a ray 220C—from the point 216B to sample the lighting contribution (e.g., incident radiance) of the ray 220B at the point 216B (e.g., using stochastic sampling). This process may continue for each interaction, until the light transport path 220 is formed. Rays of a light transport path other than the primary ray, may be referred to as reflected rays, or secondary rays, as examples. In the light transport path 220, the ray 220B, the ray 220C, a ray 220D, and a ray 220E are examples of secondary rays. Generally, a light transport path may include at least one secondary ray. Further, a light transport path may generally include an interaction with a light source, such as the light source 218 (e.g., at an end point of the light transport path). For example, each of the light transport paths 220, 222, and 224 may interact with a light source, such as the light source 218. In such examples, the light transport paths 220, 222, and 224 may include one or more additional secondary rays (not shown) to reach the light source 218.

One or more light transport paths may be used by the lighting determiner 106 to determine ray-traced samples of lighting conditions for the pixel 212. For example, the lighting determiner 106 may determine at least some lighting condition data for the pixel 212 by combining (e.g., averaging) the lighting contribution data derived from the various interactions with the virtual environment 200. The lighting determiner 106 may similarly determine at least some lighting condition data for each pixel or region of the screen 204 (e.g., using any number of primary rays and secondary rays). For example, the lighting determiner 106 may compute the lighting condition data for a pixel by applying the lighting contribution data from any number of interactions along a light transport path to the rendering equation.

In various examples, the image renderer 102 uses the ray caster 104 to implement path tracing to determine the lighting condition data. Using path tracing, the ray caster 104 may generate light transport paths (e.g., a chain of rays) from visible surface points to a light source(s). In generating a light transport path (e.g., the light transport path 220), rays may be traced recursively until hitting a light source (e.g., the light source 218). The lighting determiner 106 may recursively evaluate the rendering equation along each light transport path (e.g., at the interactions, or points thereof). Ray generation may be governed by the light source(s) and BRDFs. Recursion depth may be governed, for example, by the amount of radiance computed along a ray.

Using a path tracing approach for the light transport path 220, as an example, for the pixel 212, the ray 220A may be cast through the pixel 212. At the point 216A, the lighting determiner 106 may evaluate the rendering equation using Monte Carlo integration or another integration based sampling technique. To approximate the incident radiance, one or more secondary rays, such as the ray 220B may be traced into a random or pseudo-randomly selected sample direction. For example, a sample direction may be determined based at least in part on a BRDF, one or more light sources, and/or cosine weighting of the incident radiance. This approach may be recursively applied, for example, as long as it is determined there is a threshold amount of radiance transported along a ray. Recursion may stop for any of a variety of possible reasons, such as if a light source is hit, a maximum depth/minimum radiance is reached, the ray leaves the scene/hits the background, etc.

The image renderer 102 may use the lighting condition data for each pixel to render one or more corresponding pixels of the images 114 and/or 116. Generally, the accuracy of the lighting conditions that the lighting determiner 106 computes for a pixel with respect to a light source(s) may increase with the number of primary and/or secondary rays used to sample the lighting conditions. However, the computing resources used to determine the lighting conditions also may increase with the number of rays, which may increase render times.

To preserve computing resources and to reduce render times, the number of rays used to sample lighting conditions may be below what is needed for rendering quality to converge to an ideal ray-traced result. This may result in the lighting determiner 106 generating noisy lighting condition data, as indicated in the image 114. The image 114 is an example in which the lighting conditions of each pixel of the screen 204 is based on a single ray-traced sample of a state of the virtual environment 200 (e.g., comprising a single primary ray and a single secondary ray per incident ray). The noisy lighting condition data may be further processed to reduce or eliminate the noise and provide a high quality rendered image. In contrast, generating the image 114 using a conventional approach to path tracing that employs a single ray-traced sample of the state of the virtual environment 200 for each pixel would result in significantly more noise in the lighting condition data, and render quality that is too low for most use cases (with noticeable noise or visual artifacts). As such, conventional approaches typically require hundreds of samples or more for each pixel.

In accordance with aspects of the present disclosure, the number of samples needed by the image renderer 102 to accurately render global illumination for a virtual environment may be reduced, for example, by combing lighting contribution data from different interactions of secondary rays (e.g., of one or more light transport paths) that is used to account for radiance at an interaction when computing lighting condition data for a pixel. For example, when accounting for the lighting contribution of an interaction along a light transport path to compute lighting condition data, rather than only leveraging the lighting contribution data directly attributable to that interaction, the lighting determiner 106 may compute a composite lighting contribution for the interaction that is a combination of light contributions based on at least one other interaction that corresponds to a different incident secondary ray. This approach may be used to increase the effective sample count at one or more of the interactions that are used to compute lighting condition data for pixels. For example, another interaction may be sufficiently similar to the interaction so that the lighting contribution data for that interaction may serve as an approximation of a sample for the other interaction.

Figure 3:
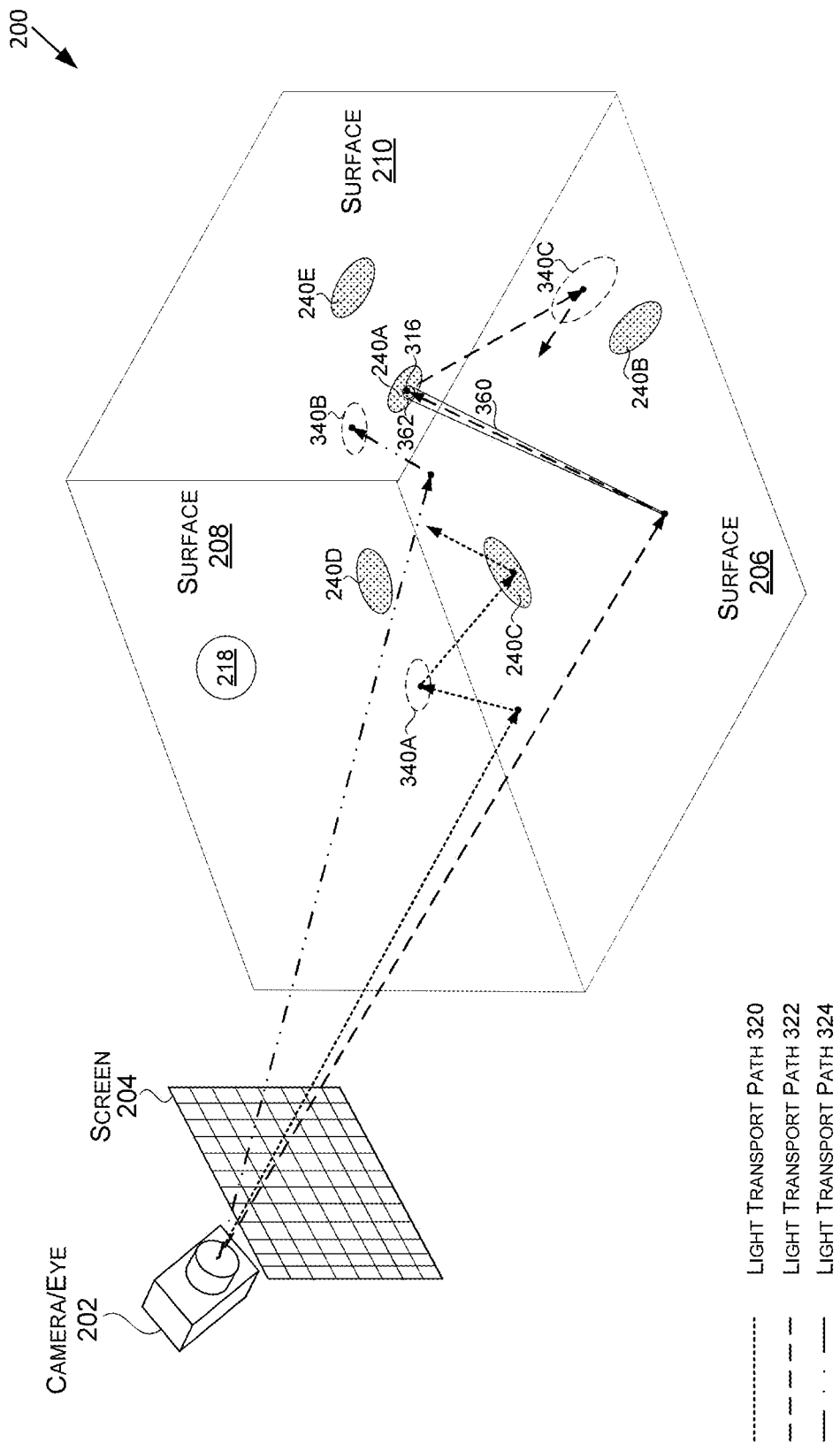
FIG. 3 is a diagram illustrating an example of temporally sharing lighting contributions of light transport paths, in accordance with some embodiments of the present disclosure.

In various examples, the lighting contributions of light transport paths may be shared between interactions spatially and/or temporally. FIG. 2 is used primarily to describe spatially sharing the lighting contributions, whereas FIG. 3 is used primarily to describe examples of temporally sharing the lighting contributions (in addition to or instead of spatial sharing). Spatially sharing lighting contribution data may refer to sharing lighting contribution data that corresponds to a common time and/or state of the virtual environment to determine lighting condition data for that time and/or state. Temporally sharing lighting contribution data may refer to sharing lighting contribution data that corresponds to different times and/or states of the virtual environment to determine lighting condition data for a time and/or state of the virtual environment (e.g., from one or more previous states and/or frames). For example, each state may be associated with a respective time and a respective rendering configuration of the virtual environment. The time may refer to a time in the render sequence and/or a playback sequence of a game, video, and/or rendered frames. The rendering configuration may refer to a set of render properties of objects (e.g., all visible objects) in the virtual environment that impact spatial rendering of the virtual environment. For example, two states may have the same rendering configuration when the render properties are the same for each state.

FIG. 2 shows examples of interactions for which the lighting determiner 106 may spatially share lighting contribution data to compute composite lighting contribution data for at least one interaction. As shown, the virtual environment includes regions 240B, 240B, 240C, 240D, and 240E which each may correspond to a region of the virtual environment 200 (e.g., a surface region). Lighting contribution data samples for the interactions that are shown as falling within the same region may be combined with one another to compute composite lighting contribution data for one to all of the interactions in computing lighting condition data for a corresponding light transport path. For example, lighting contribution data for the interaction for the point 216B of the light transport path 220 may be combined with lighting contribution data for the interaction for the point 230B of the light transport path 222 which may be used to compute lighting condition data for the light transport path 222 and/or the light transport path 220 (e.g., at the pixels of the screen 204). Although the example shares lighting contribution data between two interactions and two light transport paths, any number of interactions may be shared that correspond to any number of light transport paths.

As indicated in FIG. 2, interactions may share lighting contribution data that have the same bounce number in their corresponding light transport paths, or different bounce numbers. For example, the points 216B and 230B both correspond to a second bounce of the light transport paths 220 and 222 respectively. However, the region 240B includes a point 230C that corresponds to a third bounce of the light transport path 222 and a point 232B that correspond to a fourth bounce of the light transport path 224.

Referring now to FIG. 3, FIG. 3 is a diagram illustrating an example of temporally sharing lighting contributions of light transport paths, in accordance with some embodiments of the present disclosure. FIG. 3 is used to describe examples of interactions for which the lighting determiner 106 may temporally share lighting contribution data to compute composite lighting contribution data for an interaction. FIG. 3 may correspond to a subsequent state and/or time of the virtual environment 200 relative to the virtual environment 200. For example, FIG. 3 may correspond to a frame that the image renderer 102 renders after (e.g., immediately after) a frame corresponding to FIG. 2. The image renderer 102 may render the state similar to the state of FIG. 2, which may include generating any number of light transport paths, such as a light transport path 320, a light transport path 322, and a light transport path 324. The light transport paths 320, 322, or 324 may correspond to the same or different pixels as the light transport paths 220, 222, or 224.

In rendering the virtual environment 200, lighting contribution data for the interactions for the points along light transport paths that are shown as falling within the same region in FIGS. 2 and 3 may be combined with one another to compute composite lighting contribution data for one to all of the interactions to compute lighting condition data for a corresponding light transport path. For example, lighting contribution data for the interaction for the point 316 of the light transport path 320 of FIG. 3 may be combined with lighting contribution data for the interaction for the point 216B of the light transport path 220 of FIG. 2 and/or the interaction for the point 230B of the light transport path 222, which may be used to compute lighting condition data for the light transport path 322. Although the example shares lighting contribution data between three interactions and three light transport paths, any number of interactions may be temporally shared that correspond to any number of light transport paths. The composite lighting condition data may additionally be computed from one or more spatially shared samples of FIG. 3, similar to FIG. 2.

FIG. 3 also shows regions 340A, 340B, and 340C, which may be similar to the regions 240A, 240B, 240C, 240D, and 240E. However, the regions 340A, 340B, and 340C are not shown in FIG. 2 to indicate that interactions of FIG. 3 within those regions may not temporally share samples with interactions from the light transport paths 220, 222, and 224 of FIG. 2. However, those interactions of FIG. 3 may temporally share samples with interactions from other light transport paths not shown in FIG. 2. Also, an interaction may use one or more samples from any number of preceding states and/or frames of the virtual environment 200, which may or may not be consecutive states and/or frames. Similar to leveraging spatial samples, leveraging temporal samples may increase the effective sample count at each interaction that is used to compute lighting condition data for pixels. Determining whether to share lighting contribution data between temporally different interactions (and/or how much to weight different lighting contributions when combining them), the characteristics may also be based on an amount of motion between the states of the virtual environment and/or amount of time or frames between the states.

To ensure the lighting contribution(s) that is shared with an interaction is relevant to the interaction (e.g., sufficiently similar to the interaction so that the lighting contribution data for that interaction is an approximation of a sample for the other interaction), the lighting contribution manager 108 may base the sharing on similarities between characteristics of the interactions. As an example, lighting contributions for different interactions may be shared based on the relative locations of the corresponding surface points of the interactions. For example, lighting contributions for interactions within a defined region of the virtual environment may be shared. In FIGS. 2 and 3, these defined regions may correspond to the regions 240A, 240B, 240C, 240D, and 240E of FIG. 2 and the regions 340A, 340B, and 340C of FIG. 3. In some embodiments, interactions within the same region may be shared, whereas interactions that are not within the same region are not shared. However, in some examples, interactions within the same region may not be shared based on other factors, or the region may not be based on relative interaction locations.

The lighting contribution manager 108 may determine and/or define the regions using various approaches. In some examples, the region may be defined by a texel of a texture map (e.g., a lightmap) used to render the virtual environment 200. Interactions that are within a region of the texel may be accumulated to the texel and to compute the composite lighting contribution. For example, the size and/or shape of the region 240A may correspond to a texel and each of the interactions associated with the points 230B, 216B, and 316 may be within the texel and therefore share lighting condition data (the weightings of those samples may be based on one or more of the characteristics described herein).

Other examples of characteristics that may be used to define and/or determine whether lighting contributions of interactions are shared may be based on the hit distance associated with the incident secondary rays of the interactions, the length of the light transport paths up to the interactions, the number of bounces up to the interactions, and/or areas of path footprint approximations that correspond to the incident secondary rays. When values of one or more of those characteristics are within one or more threshold values of one another, the lighting conditions of the corresponding interactions may be shared.

As an example, the lighting contributions for the points 216B, 230B, and/or 316 may be shared based on the areas of the corresponding path footprint approximations for the secondary rays 220B and 222A at the corresponding points 216B and 230B being of a similar size within a threshold size of one another). For example, FIG. 3 shows a path footprint approximation for the interaction at the point 316 having an area 362. Various approaches may be used for determining the path footprint approximation, such as path perturbation approaches or ray differentials. The areas for the points 216B and 230B may be similar to the area 362 (e.g., within a threshold amount), resulting in the lighting contributions being shared. However, lighting contribution data for another point that falls within the region 240A may not be shared with the points 216B, 230B, or 316 based on the path footprint approximations of the associated incident ray being sufficiently smaller or larger than the path footprint approximations for the points 216B, 230B, or 316 (e.g., having an area outside of a threshold range).

In various examples, one or more of the characteristics may define a size of a defined region of the virtual environment in which the lighting contributions for interactions may be shared. For example, the hit distance associated with the incident secondary rays of the interactions, the length of the light transport paths up to the interactions, the number of bounces up to the interactions, and/or areas of path footprint approximations that correspond to the incident secondary rays may be used to select and or compute the size of the defined region. By basing the size of the region used to share lighting contributions on the characteristics, the regions may be larger for interactions where a coarser approximation of a lighting contribution is appropriate, such as to account for increased blur the farther an interaction is from the viewpoint camera.

For example, the size of the region that defines what is shared with an interaction may increase as a function of one or more of the hit distance associated with the incident secondary ray of the interaction, the length of the light transport path up to the interaction, the number of bounces up to the interaction, and/or the area of a path footprint approximation that corresponds to the incident secondary ray.

In examples where the texture map is implemented as a mipmap, the size may be defined by the lighting contribution manager 108 selecting a level in the mipmap based on the one or more characteristics, and the texel at the selected level. The system may for each interaction select a level, and lighting contributions of interactions with that selected level may have shared lighting contributions where they each correspond to the texel at that level. The level the lighting contribution manager 108 selects may define the size and/or shape of the region that defines what interactions may share lighting contribution data. Further, the lighting contribution manager 108 may select a level for each interaction. This selection may be based on any of the examples described herein using any of the various interaction characteristics (e.g., path footprint area, hit distance, number of bounces, etc.). For example, the lighting contribution manager 108 may share lighting contribution data between interactions when the lighting contribution manager 108 both selects the same level for the interactions and the interactions fall within the same texel of that level.

Figure 4:
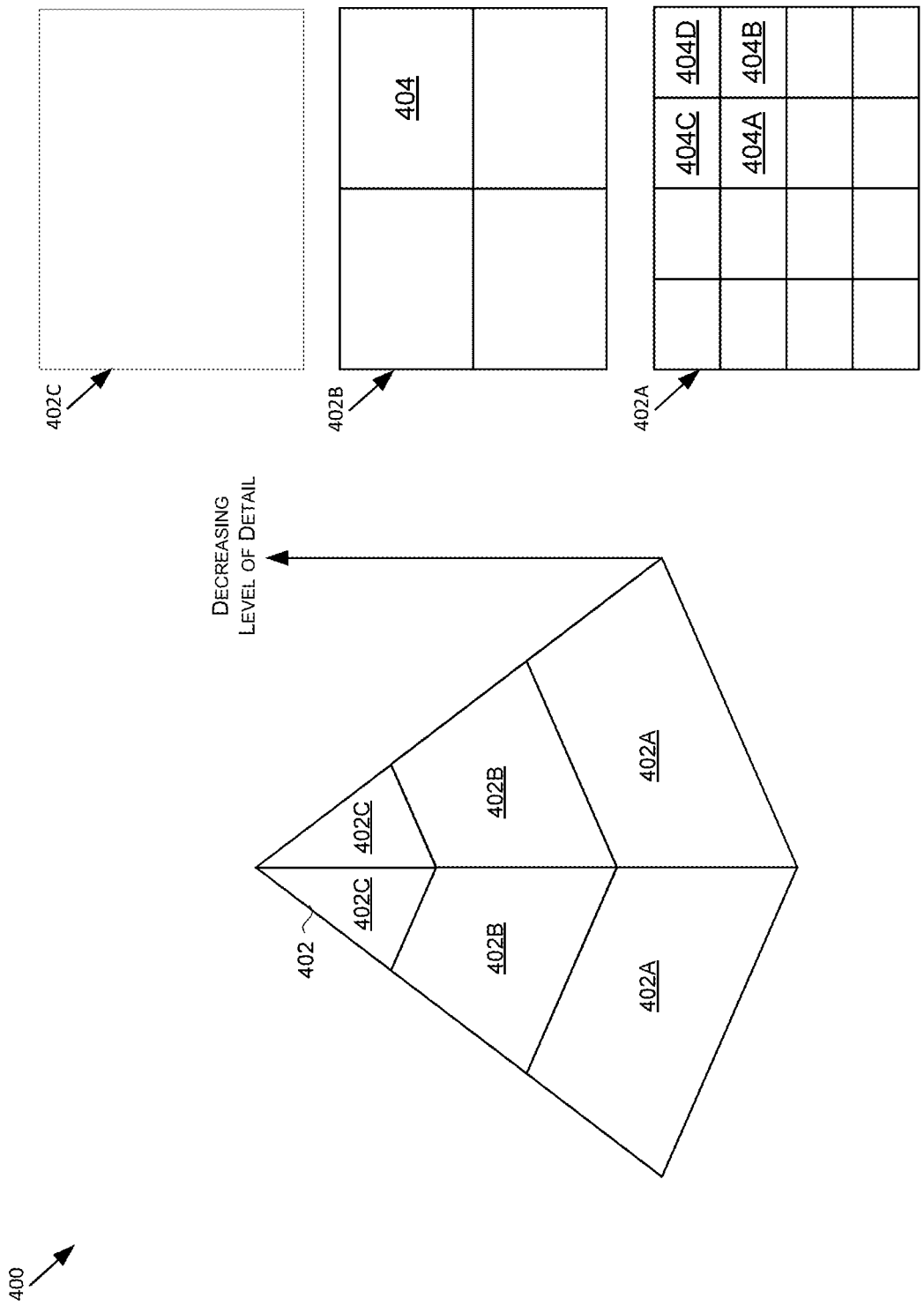
FIG. 4 is a diagram illustrating an example of a mipmap and texels which may be used to define a region of shared lighting conditions, in accordance with some embodiments of the present disclosure.

Referring now to FIG. 4, FIG. 4 is a diagram illustrating an example of a mipmap 400 and texels which may be used to define a region of shared lighting contributions, in accordance with some embodiments of the present disclosure. The mipmap 400 is illustrated using a pyramid 402 which may represent levels 402A, 402B, and 402C of progressively lower resolution representations of the same image. Although FIG. 4 shows three levels, the mipmap 400 may include any number of levels. Also, in some examples, a mipmap may not be used, but the texels of a texture map may be used similar to the texels of the mipmap (e.g., as described above).

As shown, each level 402A 402B, and 402C includes a number of texels with higher resolution levels having more and smaller texels, which may be arranged in a grid-like pattern. In various embodiments, a region used to share lighting contribution data may be defined at least partially by one or more of the texels. For example, each texel may correspond to a defined region. As an example, the region 240A of FIG. 2 may be defined by the texel 404 of FIG. 4 and have a size and/or shape that is the same as the texel 404 or otherwise based on the size and/or shape of the texel 404. Thus, the locations of the points 216B and 230B in FIG. 2 may fall within the texel 404. In some examples, when the ray caster 104 determines an interaction, the lighting contribution manager 108 may determine the texel corresponding to the interaction and store the lighting contribution data for that interaction to the texel. Similarly, the lighting contribution data for other interactions may be stored to the texel. For example, the lighting contribution data from different interactions may be accumulated to the texel, such as by computing and storing the combined lighting contribution data to the texel.

In some embodiments, the lighting contribution manager 108 selects a texel for an interaction based at least on part on one or more characteristics of the interaction. For example, the lighting contribution manager 108 may select the level of the mipmap based on the one or more characteristics and use the texel that the interaction falls within at that level to define the region for the interaction. If the lighting contribution manager 108 selects the level 402A for an interaction, the lighting contribution manager 108 may select the texel 404A of that level if the interaction falls within the texel 404A. However, if the lighting contribution manager 108 instead selects the level 402B for the interaction, the lighting contribution manager 108 may select a texel 404, which covers locations of the texel 404A, a texel 404B, a texel 404C, and a texel 404D in the level 402A.

Thus, the texel 404 may be larger and account for additional samples based on the characteristics of the interaction. Examples of characteristics that may be used to define the size of the region (e.g., to select the level of the mipmap 400) include one or more of the hit distance associated with the incident secondary ray of the interaction, the length of the light transport path up to the interaction, the number of bounces up to the interaction, and/or an area of a path footprint approximation that corresponds to the incident secondary ray. When values of one or more of those characteristics are within one or more threshold values of one another (e.g., within the same threshold range), the lighting contributions of corresponding interactions may be shared. For example, the level of the mipmap used to define the region of what is shared with an interaction may increase and decrease as a function of one or more of the hit distance associated with the incident secondary ray of the interaction, the length of the light transport path up to the interaction, the number of bounces up to the interaction, and/or the area of a path footprint approximation that corresponds to the incident secondary ray.

To share lighting contribution data between interactions, the lighting contribution manager 108 may store the lighting contribution data in a cache. For example, the cache may be an irradiance cache that stores spatial irradiance data. Any number of caches may be used and may correspond to the regions in which lighting contribution data is shared between interactions. Each region may have a corresponding cache. As examples, the cache can be either a texture space lightmap atlas, or a three-dimensional (3D) spatial hash, or a combination of the two. In the example of a region corresponding to a texel, the cache may include or correspond to the texel, such as described above. The texel is an example of a local data store, or cache, for an interaction, as it corresponds to the location of the interaction in a virtual environment.

Some examples of how the lighting determiner 106 uses the shared lighting contribution data to compute lighting condition data for pixels are described by way of example only, and other suitable approaches may be used. The lighting determiner 106 may use a light transport solver that employs the cache(s) to smooth the solution both spatially and temporally. The light transport solver may, for example, be a Jacobi radiosity solver and may use a screen-space path sampler (e.g., a screen-space path sampler Monto Carlo) to update the solution at each frame, while reusing the solution from one or more previous frames.

In any suitable example, the lighting contribution data that is shared between interactions of a scene may form a discretized finite-element solution to the rendering equation, which may be represented as a solution vector B at frame t. At frame t+1 the lighting determiner 106 may compute a new solution vector B' using equation (1):

$$B' = T B + E \quad (1)$$

where E is the emission of the various surface elements, and T is the usual transport operator.

In various embodiments, the lighting determiner 106 may compute the solution vector for a frame by sampling paths starting from the camera 202, and by the ray caster 104 scattering them at each interaction with the virtual environment 200—as performed in regular path tracing. However, unlike in regular path-tracing, the lighting contribution manager 108 may use each scattering event to update the local cache entry at the surface hit point (e.g., the point 216B, 230B, etc.), treating the new scattered particle as a single sample unbiased estimator of the local transport operator T. Hence, if the ith vertex along the light transport path 220 hits the region 240A, and the vertex i+1 hits the region 240D, essentially, the lighting determiner 106 may treat the segment between them as a sample of the form factor F_pq between the two surface elements (p, q), and the ray caster 104 may update B'_p using the previous frame solution B_q.

Using this approach, the lighting determiner 106 may use the light transport solver to smooth the solution both in space (across the fine element's extents) and in time (reusing information from one or more previous frames). In order to limit the temporal extent, the lighting determiner 106 may average the new solution vector with the previous vector using a modified exponential average method or other algorithm (e.g., a moving average algorithm).

The exponential average method that is modified may employ equation (2):

$$S\_t = \text{alpha} * Y\_t + (1-\text{alpha}) * S\_\{t-1\} \quad (2)$$

where S_t represents the average at time t, and Y_t represents a new sample.

The exponential average method that employs equation (2) may then be modified to perform a simple running average using the modified weight of equation (3):

$$\text{alpha}\_t = 1//t \quad (3)$$

Using such a formula would result in a regular (and optimal) Monte Carlo average if the lighting was static. However, in a dynamic environment, where objects move and the lighting solution changes at every frame, this approach may not converge the true solution, and may create extreme ghosting. In order to reduce or eliminate the ghosting while preserving some of the temporal averaging effect, the exponential average method that employs equation (2) may be modified to perform a simple running average using the modified weight of equation (4):

$$\text{alpha}\_t = \text{alpha} * \text{sqrt}(1/t) \quad (4)$$

where alpha is a base value, such as in the range [0.7, or 1). If light sources in the virtual environment 200 change, causing a global modification to the solution vector, the lighting determiner 106 may reset the time t.

In computing the lighting condition data for pixels, the lighting determiner 106 may optionally use the lighting reprojector 110. When used in combination with sharing lighting contribution data, as described herein, this may result in the image 116, as opposed to the image 114. The lighting reprojector 110 may be used by the lighting determiner 106 to reproject lighting contributions of light transport paths in computing the data representative of the lighting conditions. For example, instead of simply determining the combined lighting contribution data at every visible surface (e.g., by looking up the cache), the lighting determiner 106 may use the lighting reprojector 110 to obtain and apply the lighting contribution data at the second hits along the light transport paths previously sampled. The lighting determiner 106 may use this approach to effectively result in using a hybrid between the finite-element solver, and a plain Monte-Carlo path tracer—essentially taking the finite element solution for bounces 2, . . . N, and using raw Monte Carlo sampling (or a different type of sampling) for the first bounce. This may result in the lighting condition data for the first bounce being better defined, as it will not be smoothed like the finite-element solution.

Figure 5:
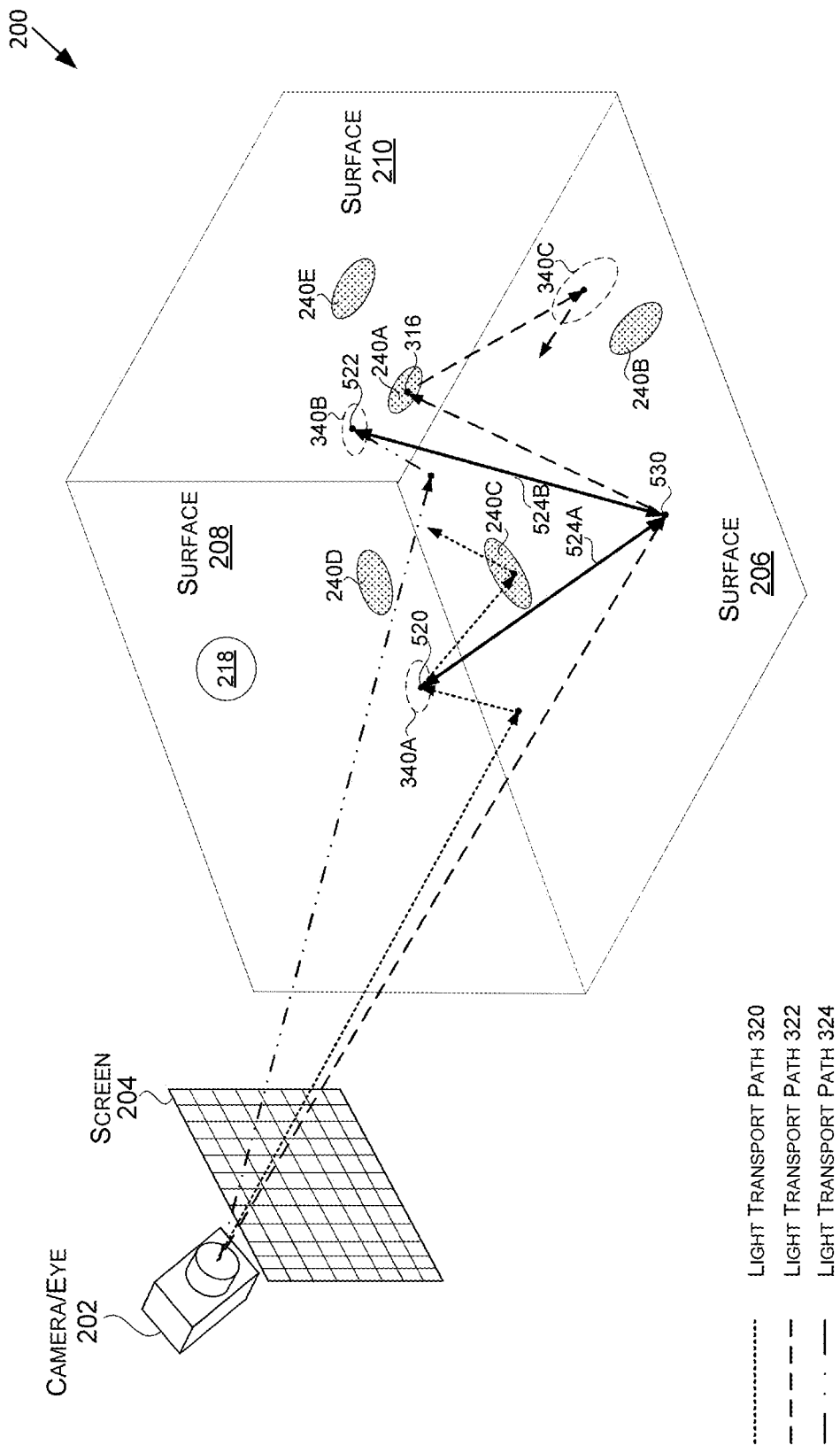
FIG. 5 is a diagram illustrating an example of reprojecting lighting contributions of light transport paths, in accordance with some embodiments of the present disclosure.

The lighting determiner 106 may in some embodiments use the lighting reprojector 110 without sharing lighting contribution data, as described herein, or more generally when computing lighting condition data for pixels using ray-tracing, such as path tracing. Thus, the forgoing example may be more generally stated as when using a light transport solver, instead of simply determining the lighting contribution data at every visible surface, the lighting determiner 106 may use the lighting reprojector 110 to obtain and apply the lighting contribution data (composite or otherwise) at the second hits along the light transport paths previously sampled. FIG. 5 is a diagram illustrating an example of reprojecting lighting contributions of light transport paths, in accordance with some embodiments of the present disclosure. To illustrate the example above, instead of simply determining the lighting contribution data at a point 530 of the surface 206, the lighting determiner 106 may use the lighting reprojector 110 to obtain and apply the lighting contribution data (composite or otherwise) at the second hits along the light transport paths previously sampled, examples of which include the lighting contribution data at a point 520 and a point 522, as indicated by arrows 524A and 524B in FIG. 5.

Figure 6:
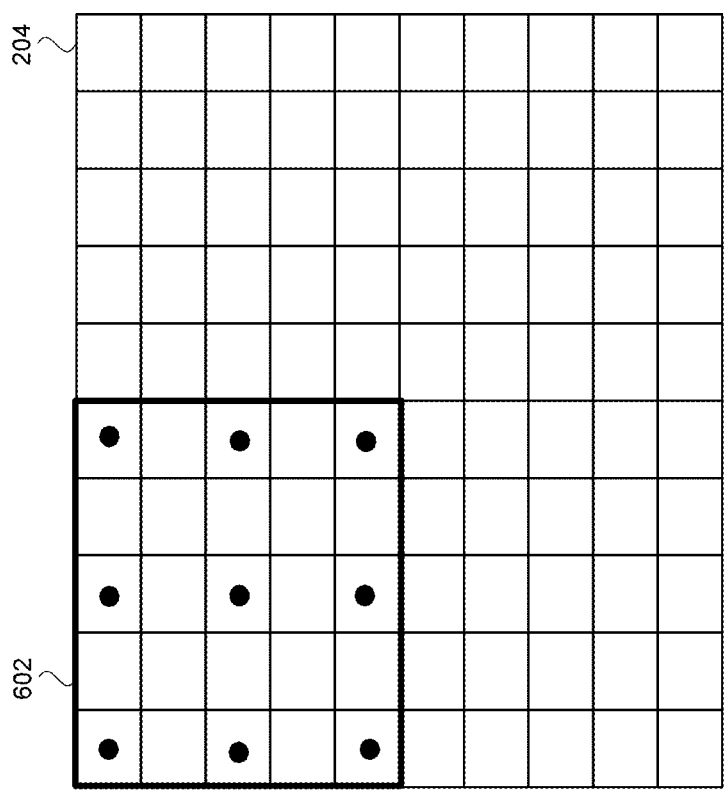
FIG. 6 is a diagram illustrating an example of applying an image filter to reproject lighting contributions of light transport paths, in accordance with some embodiments of the present disclosure.

The lighting reprojector 110 may reproject lighting contribution data using a filter, such as a cross-bilateral filter, that is applied in screen-space to the lighting condition data of the pixels. Applying the filter may function to reproject samples from neighboring pixels that fall within the filter's footprint, taking into account the physical configuration of the various (infinitesimal) surface elements involved, as illustrated in FIG. 5. To do so, the lighting reprojector 110 may multiply each pixel's reprojection weight by the filter weight. Referring now to FIG. 6, FIG. 6 is a diagram illustrating an example of applying an image filter (e.g., a spatial filter) to reproject lighting contributions of light transport paths, in accordance with some embodiments of the present disclosure. The image filter has a footprint 602 for which the lighting reprojector 110 may filter for each pixel that is within the footprint 602, as shown in FIG. 6 (unless the render data for the pixel is discarded). This may involve convolving the render data for the pixels with the filter kernel of the image filter in which a weighted sum may be computed around each pixel.

The render data may include, for each pixel, the position, or location, p_h of what has been seen by the secondary ray of the pixel (e.g., the first secondary ray), the normal at that position N_h, and the lighting contribution data, or color, C_h at that position. To apply the filter, the color may be obtained directly from the cache. When applying the filter, the lighting reprojector 110 may use the positions, normals, and lighting contribution data for secondary bounces of adjacent pixels to compute each pixel's reprojection weight. The pixel's reprojection weight may be computed by, for each neighbor pixel, computing the geometric term between the visible point and the position of the neighbor pixel hit point (e.g., indicted by the arrows 524A and 524B in FIG. 5) multiplied by the lighting contribution at that point, then combining the results into a weighted sum. This approach may capture how much of the light seen by secondary rays of neighbor pixels (e.g., at the points 520 and 522) is also seen by the pixel (e.g., at the point 530). For example, the geometric term G corresponding to the point 520 and the arrow 524A in FIG. 5 may be computed using equation (5):

$$G=(N1 \cdot N2)/(r*r) \quad (5)$$

where N1 is the normal at the point 530, N2 is the normal at the point 520, and r is the distance between those points.

In some examples, the image filter is applied as a sliding window filter, and the footprint 602 is an example of the sliding window. Also, the image filter may be a strided filter. Using the strided filter, when filtering for each pixel rather than considering the direct neighbors, striding may be applied so that spacing is introduced between the pixels, as indicated by spaced out dots in FIG. 6. The striding may be, for example, one or two pixels. The filtering process may be equivalent to a low pass filter on the noise. By striding the filter, the frequency of the low pass filter is modified, resulting in clamps of light in the image, which may appear as splotches that are spread out at a higher frequency that is more pleasing to the human eye. An example of a suitable strided spatial filter is a strided box filter. The strided spatial filter may, as a non-limiting example, use anywhere from five to ten taps per pixel.

Figure 7:
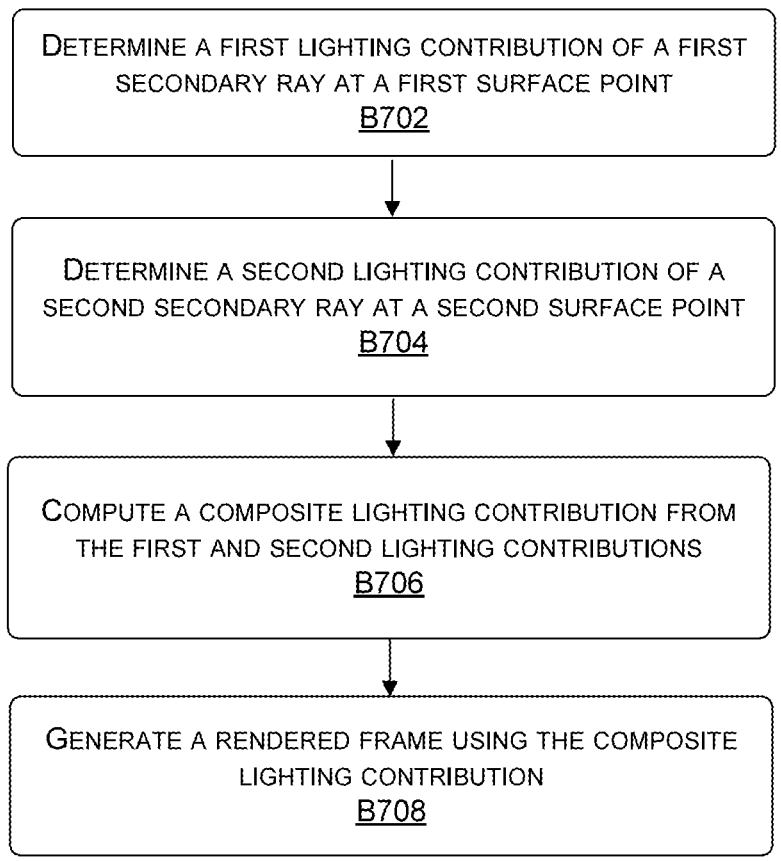
FIG. 7 is a flow diagram showing a method for rendering a virtual environment using shared lighting contributions based on one or more characteristics of secondary rays, in accordance with some embodiments of the present disclosure.

Now referring to FIG. 7, each block of a method 700, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the rendering system 100 (FIG. 1). However, these methods may additionally or alternatively be executed by any one system, or any combination of systems, including, but not limited to, those described herein.

FIG. 7 is a flow diagram showing the method 700 for rendering a virtual environment using shared lighting contributions based on one or more characteristics of secondary rays, in accordance with some embodiments of the present disclosure. The method 700, at block B702, includes determining a first lighting contribution of a first secondary ray at a first surface point. For example, the lighting determiner 106 may determine a lighting contribution of the ray 220B of the light transport path 220 at the point 216B of the virtual environment 200.

The method 700, at block B704, includes determining a second lighting contribution of a second secondary ray at a second surface point. For example, the lighting determiner 106 may determine a lighting contribution of the ray 222A of the light transport path 222 at the point 230B of the virtual environment 200.

The method 700, at block B706 includes computing a composite lighting contribution from the first and second lighting contributions. For example, the lighting determiner 106 may compute a composite lighting contribution of the light transport path 220 from the first lighting contribution and the second lighting contribution based on one or more characteristics of the ray 220B and the ray 222A.

The method 700, at block B708, includes generating a rendered frame using the composite lighting contribution. For example, the image renderer 102 may generate a rendered frame corresponding to the image 114 and/or the image 116 using the composite lighting contribution.

Figure 8:
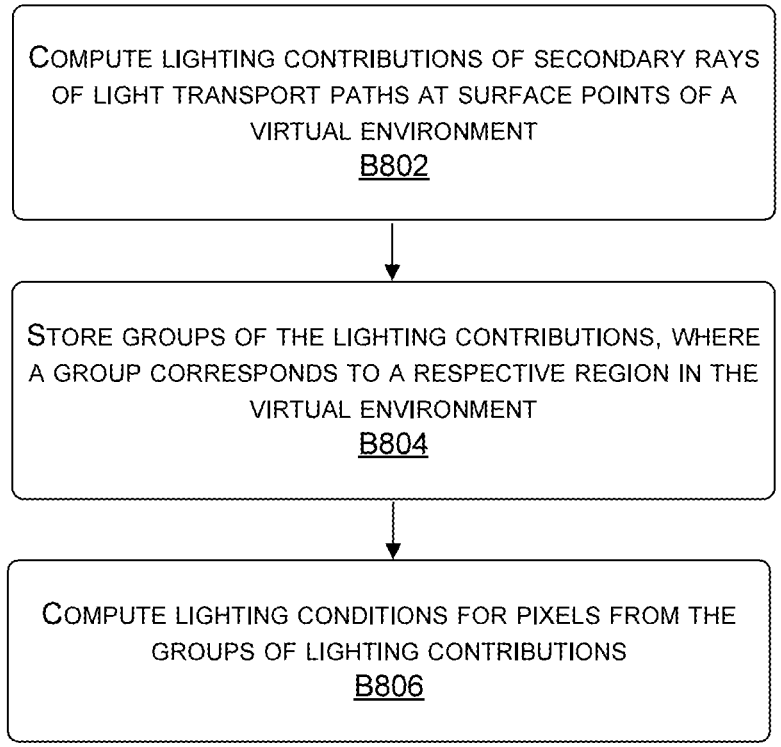
FIG. 8 is a flow diagram showing a method for rendering a virtual environment using shared lighting contributions based on regions in the virtual environment that correspond to interactions of secondary rays, in accordance with some embodiments of the present disclosure.

FIG. 8 is a flow diagram showing a method 800 for rendering a virtual environment using shared lighting contributions based on regions in the virtual environment that correspond to interactions of secondary rays, in accordance with some embodiments of the present disclosure.

The method 800, at B802 includes computing lighting contributions of secondary rays of light transport paths at surface points of a virtual environment. For example, the lighting determiner 106 may compute lighting contributions of any of the various secondary rays of the light transport paths 220, 222, or 224 of FIG. 2, the light transport paths 320, 322, and 324 of FIG. 3, and/or other light transport paths not shown in those figures, at surface points of the virtual environment 200.

The method 800, at B804 includes storing groups of the lighting contributions, where a group corresponds to a respective region in the virtual environment. For example, the lighting contribution manager 108 may store a first group of lighting contributions that corresponds to the region 240A and a second group of lighting contributions that corresponds to the region 240D based on one or more characteristics of the lighting contributions being associated with the corresponding regions.

The method 800, at B806 includes computing lighting conditions for pixels from the groups of lighting contributions. For example, the lighting determiner 106 may compute lighting conditions of pixels of the screen 204 associated with the light transport paths from the groups of the lighting contributions.

Figure 9:
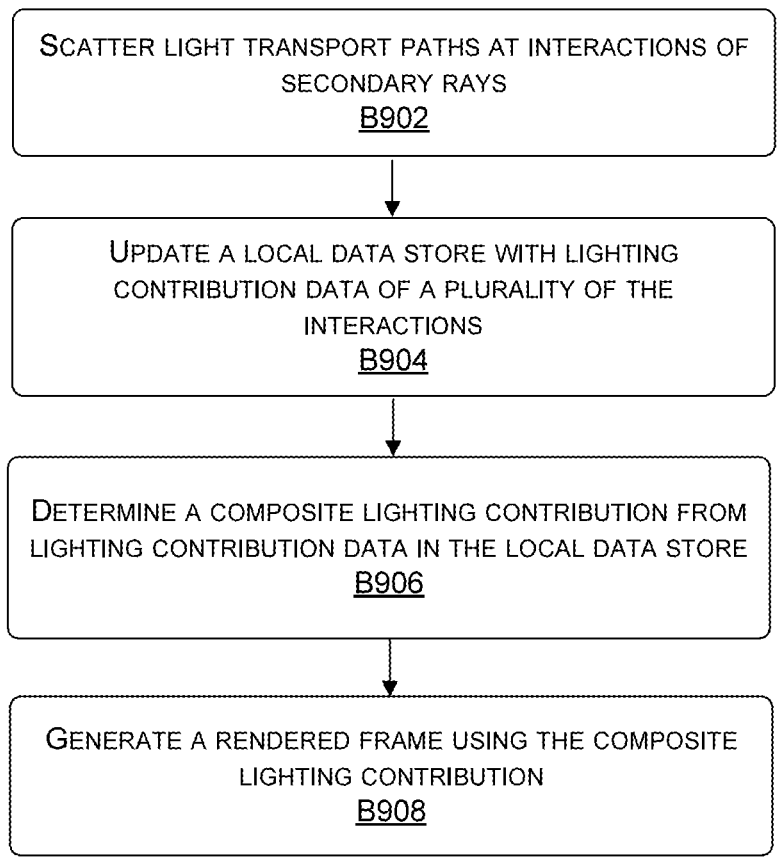
FIG. 9 is a flow diagram showing a method for rendering a virtual environment using shared lighting contributions based on local data stores that correspond to interactions of secondary rays, in accordance with some embodiments of the present disclosure.

FIG. 9 is a flow diagram showing a method 700 for rendering a virtual environment using shared lighting contributions based on local data stores that correspond to interactions of secondary rays, in accordance with some embodiments of the present disclosure.

The method 900, at block B902, includes scattering light transport paths at interactions of secondary rays. For example, the ray caster 104 may scattering the light transport paths 220, 222, and 224 in the virtual environment 200 at interactions of secondary rays, such as the rays 220B, 222A, 220C, or 220D. The ray caster 104 may also sampling the light transport paths from a perspective of a viewer in the virtual environment 200, such as via the camera 202. Further, the ray caster 104 may detecting the interactions of the secondary rays and scatter the light transport paths upon detecting the interactions.

The method 900, at block B904, includes updating a local data store with lighting contribution data of a plurality of the interactions. For example, the lighting contribution manager 108 may update, based on the scattering, a local cache at a texel that corresponds to the region 240A (e.g., in a texture map) with lighting contribution data of a plurality of the interactions based on locations of the interactions.

The method 900, at block B906, includes determining a composite lighting contribution from the lighting contribution data in the local data store. For example, the lighting determiner 106 may determine a composite lighting contribution of the light transport path 220 that includes an interaction of the plurality of the interactions from the lighting contribution data in the local data store.

The method 900, at block B908, includes generating a rendered frame using the composite light contribution. For example, the image renderer 102 may generate a rendered frame corresponding to the image 114 and/or the image 116 using the composite lighting contribution.

Figure 10:
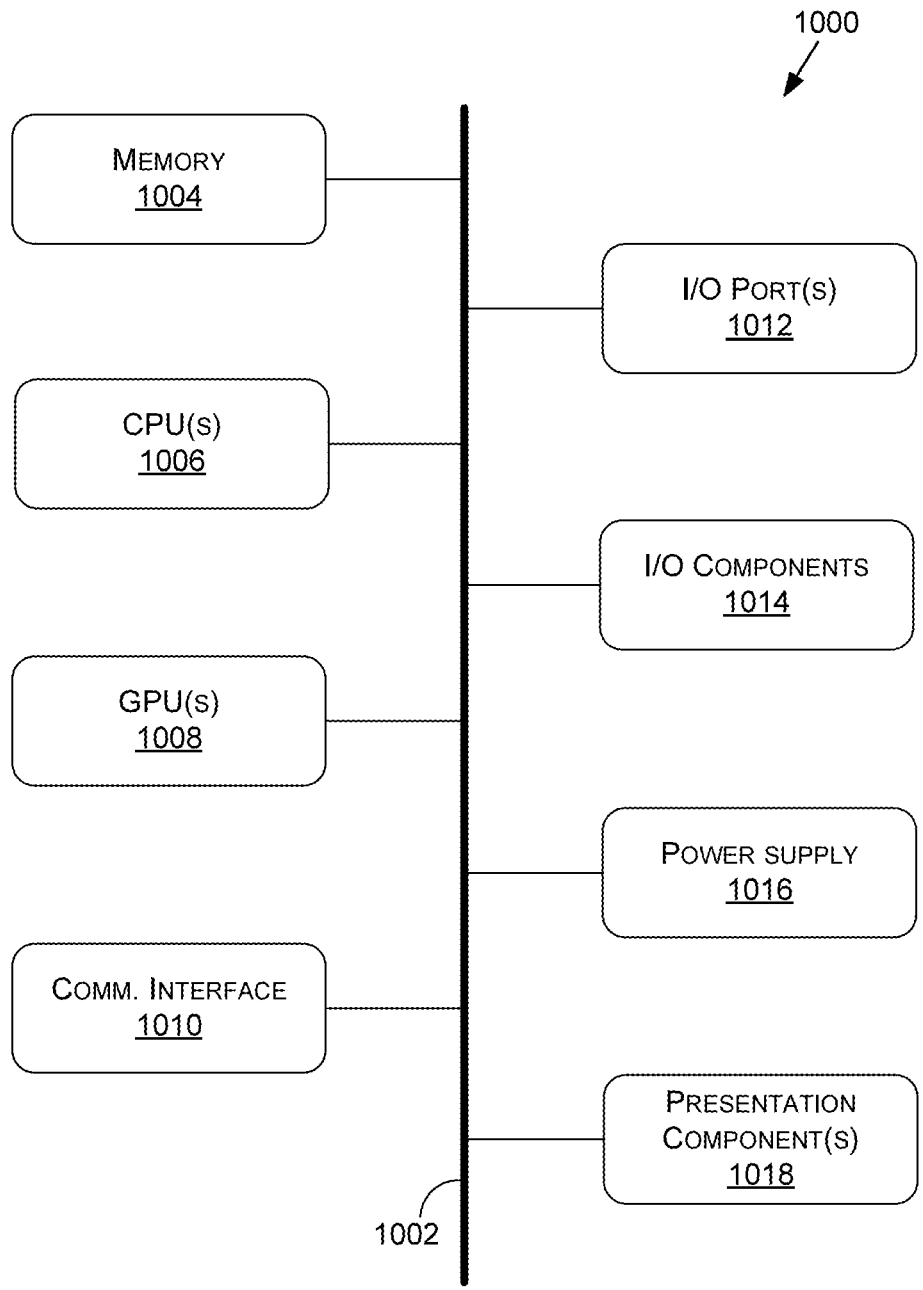
FIG. 10 is a block diagram of an example computing device suitable for use in implementing some embodiments of the present disclosure.

FIG. 10 is a block diagram of an example computing device 1000 suitable for use in implementing some embodiments of the present disclosure. Computing device 1000 may include a bus 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, and one or more presentation components 1018 (e.g., display(s)).

Although the various blocks of FIG. 10 are shown as connected via the bus 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The bus 1002 may represent one or more busses, such as an address bus, a data bus, a control bus, or a combination thereof. The bus 1002 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

The GPU(s) 1008 may be used by the computing device 1000 to render graphics (e.g., 3D graphics). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data. The display memory may be included as part of the memory 1004. The GPU(s) 1008 may include two or more GPUs operating in parallel (e.g., via a link). When combined together, each GPU 1008 may generate pixel data for different portions of an output image or for different output images (e.g., a first GPU for a first image and a second GPU for a second image). Each GPU may include its own memory, or may share memory with other GPUs.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through communications network.

As used herein, a recitation of "and/or" with respect to two or more elements should be interpreted to mean only one element, or a combination of elements. For example. "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The invention claimed is:

1. A method comprising:
    comparing one or more characteristics of an interaction of a light transport path within a virtual environment with one or more criteria corresponding to a cache, the one or more criteria indicating first radiant power at the interaction is similar in magnitude to second radiant power at each of one or more other interactions within the virtual environment that have one or more samples of the second radiant power stored in the cache;
    based at least on the comparing indicating the one or more characteristics satisfy the one or more criteria, determining radiance at the interaction in the light transport path using the one or more samples stored in the cache as at least one sample of the first radiant power for the interaction;
    determining radiance of the light transport path using the radiance at the interaction; and
    generating a rendered frame using the radiance of the light transport path.

2. The method of claim 1, wherein the one or more characteristics include one or more of a location of the interaction within the virtual environment, or a hit distance corresponding to the interaction.

3. The method of claim 1, wherein the comparing includes determining a point of the interaction falls within a texel corresponding to a texture map of a surface comprising the point, and the cache corresponds to the texel.

4. The method of claim 1, wherein the comparing is based at least on selecting a level of a mipmap based at least on the one or more characteristics of the interaction, and the cache corresponds to the level of the mipmap.

5. The method of claim 1, wherein the one or more samples include spatial samples of the virtual environment.

6. The method of claim 1, wherein the one or more samples include a temporal sample of the virtual environment.

7. The method of claim 1, wherein the one or more samples represent irradiance.

8. The method of claim 1, further comprising based at least on the comparing indicating the one or more characteristics satisfy the one or more criteria, storing an average value of a sample of the first radiant power at the interaction and the one or more samples of the second radiant power in the cache.

9. The method of claim 1, wherein the one or more samples include a plurality of samples and the using the one or more samples includes using an average of the plurality of samples as the at least one sample of the first radiant power for the interaction.

10. The method of claim 1, wherein the cache is a first cache, and the method further includes:
   determining a second cache comprising data storing a plurality of samples of third radiant power based at least casting a ray from the interaction using the one or more samples stored in the cache; and
   determining a sample of the first radiant power for the interaction based at least on the plurality of samples stored in the second cache.

11. The method of claim 1, wherein the comparison is performed based at least on identifying the interaction within the virtual environment.

12. A system comprising:
   one or more processing units to execute operations comprising:
      comparing a location of an interaction of a light transport path within a virtual environment with one or more criteria defining a region in the virtual environment that corresponds to a cache, the one or more criteria indicating radiant power for the interaction is similar in magnitude to radiant power at least one or more other interactions that have one or more samples of the radiant power stored in the cache;
      based at least on the comparing indicating the location falls within the region, using the one or more samples stored in the cache as at least one sample of the radiant power for the interaction to determine radiance at the interaction in the light transport path;
      determining radiance of the light transport path using the radiance at the interaction; and
      generating a rendered frame using the radiance of the light transport path.

13. The system of claim 12, wherein the one or more criteria correspond to a hit distance associated with the interaction.

14. The system of claim 12, wherein the using the one or more samples weights a sample of radiant power for the interaction based at least on one or more magnitudes corresponding to the one or more criteria.

15. The system of claim 12, wherein the using the one or more samples includes scattering the light transport path at the interaction to generate one or more scattered particles, and a scattered particle of the one or more scattered particles is treated as a single sample unbiased estimator of a local transport operator of a rendering equation solution for the light transport path.

16. The system of claim 12, wherein the cache corresponds to a texel in a level of a mipmap.

17. A processor comprising:
   one or more circuits to render an image using radiance of a light transport path that is determined using radiance at an interaction of the light transport path within a virtual environment, the radiance at the interaction determined based at least on:
      comparing one or more characteristics of the interaction with one or more criteria corresponding to a cache, the one or more criteria indicating radiant power at the interaction is similar in magnitude to radiant power at each of one or more other interactions within the virtual environment that have one or more samples of the radiant power stored in the cache; and
      based at least on the comparing indicating the one or more characteristics satisfy the one or more criteria, using the one or more samples stored in the cache as at least one sample of the radiant power for the interaction to determine the radiance at the interaction in the light transport path.

18. The processor of claim 17, wherein the one or more characteristics include hit distances corresponding to the interaction.

19. The processor of claim 17, wherein the cache stores the one or more samples based at least on points of the interactions each falling within a texel corresponding to a texture map of a surface comprising the points.

20. The processor of claim 17, wherein the cache stores the one or more samples based at least on points of the interactions each falling within a region corresponding to the cache in the virtual environment.

* * * * *